(12) United States Patent
Fontaine et al.

(10) Patent No.: US 6,929,046 B1
(45) Date of Patent: Aug. 16, 2005

(54) TIRE IN WITH CAVITIES IN BEAD REGION

(75) Inventors: Jean François Léon Fontaine, Burden (LU); Jean-Marie Jules Joseph Koeune, Bastogne (BE)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/148,870

(22) PCT Filed: Dec. 16, 1999

(86) PCT No.: PCT/US99/30094

§ 371 (c)(1), (2), (4) Date: Jun. 3, 2002

(87) PCT Pub. No.: WO01/43993

PCT Pub. Date: Jun. 21, 2001

(51) Int. Cl.⁷ .................... B60C 15/00; B60C 15/024
(52) U.S. Cl. .................................. 152/539; 152/544
(58) Field of Search ............................ 152/539, 544

(56) References Cited

U.S. PATENT DOCUMENTS 3,915,215 A * 10/1975 Nebout ................. 152/381.4
4,015,652 A    4/1977 Harris
5,145,536 A    9/1992 Noma et al.
5,769,981 A    6/1998 Turley et al.

FOREIGN PATENT DOCUMENTS

| DE | 2500894 | * | 7/1976 |
|----|---------|---|--------|
| EP | 0774368 |   | 5/1997 |
| JP | 62299411 |  | 12/1987 |
| JP | 3-169727 | * | 7/1991 |
| JP | 04154411 | * | 5/1992 |
| JP | 05193312 |   | 8/1993 |
| JP | 06183223 | * | 7/1994 |
| JP | 10-193927 | * | 7/1998 |
| JP | 2002-211215 | * | 7/2002 |

* cited by examiner

Primary Examiner—Jeff H. Aftergut
Assistant Examiner—Justin R Fischer
(74) Attorney, Agent, or Firm—Howard M. Cohn

(57) ABSTRACT

The present invention relates to a pneumatic tire, specifically to improvements to the bead region of tires designed for runflat operations. The improvements comprise the addition of cavities or indentation (126) on the surface of the bead (127) that contacts the wheel rim (128). In a first embodiment a series of circular cavities (126) are located on the radial innermost surface of the bead in the proximity of the bead toe. In a second embodiment, a continuous groove-like torus cavity (226) is located in the radially innermost surface of the bead in the proximity of the bead toe. The series of cavities or torus cavity increase the adherence of the bead to the rim as a small volume of air at a low pressure, significantly inferior to the atmospheric pressure (air vacuum situation) is trapped in the void spaces created by the cavities or torus cavity and the bead seat.

6 Claims, 3 Drawing Sheets

TIRE IN WITH CAVITIES IN BEAD REGION

TECHNICAL FIELD

The present invention relates to a pneumatic tire, specifically to improvements to the bead region of tires designed for runflat operations.

BACKGROUND OF THE INVENTION

An important design consideration in the development of a run-flat tire is insuring that the uninflated tire remains seated on the rim. Solutions have been developed employing bead restraining devices as well as special rims to accomplish this requirement.

The design of the bead region for extended mobility technology (EMT) tires requires the balance of two opposing criteria. The design of the bead region must provide the means for the bead to remain seated on the rim during uninflated operation and the design should be compatible with conventional wheel rims. The design should also allow the tire to be installed on a conventional wheel without special equipment or procedures and removed from a conventional wheel without damage to the tire. The prior art shows a variety of approaches, however, none provide a completely satisfactory solution to the problem or an optimum balance of operating characteristics when uninflated and compatibility with conventional wheels, tires, and mounting procedures.

The compressive force of the air in typical pneumatic tire is confined by the carcass plies in tension. The tensile force in the carcass plies is transmitted to the bead cores, placing the bead cores in tension. The bead core holds the bead seat radially inward against the rim of the wheel and in the case of tubeless tires maintains an air tight seal between the bead and rim bead seat of the wheel. The compressive force of the air in the tire also exerts an axial outward force on the bead region of the tire pressing the axially outward facing surfaces of bead seat against the rim flange. The relatively thin and flexible sidewalls of a normally inflated conventional tire do not transmit significant compressive forces, bending moments or axially inward forces to the bead region except possibly under conditions of severe cornering or breaking.

In comparison, EMT tires often rely on a thickened and reinforced sidewall construction to provide uninflated operation. These thickened and reinforced sidewalls are capable of transmitting compressive and bending stresses to the bead regions of the tire particularly during under-inflated or uninflated operation. These compressive and bending stresses conspire to unseat the bead from the rim particularly when combined with the additional lateral forces encountered in cornering. The compressive loading of the reinforced sidewalls carries an axial inward component tending to unseat the bead. The bending stresses tend to lift the radially and axially innermost edge of the bead or bead toe facilitating the slippage of the bead over any humps or protrusions that may be provided axially inward of the bead seat.

The prior art shows a considerable variety of approaches to the design a bead-wheel interface capable of resisting the axially inward forces that may be encountered during uninflated operation. Many of these approaches require modifications to the wheel rim as well as the bead region of the tire to provide and interlocking geometry where circumferential grooves or humps on the bead are matched by complementary grooves or humps on the flange and bead seat regions of the wheel. However the use of non-standards wheels and tires has not received wide application.

A more simple solution is to increase the size and strength of the bead core to improve the runflat operation. However, as the strength of the bead core is increased, mounting the tire on a wheel becomes more difficult and may require special equipment.

Another approach is to redesign the wheel and tire bead with a non-conventional geometry. For example, U.S. Pat. No. 5,145,536 ('536) discloses a bead profile with an elastomeric projection or toe extending radially and axially inward from the bead core and a wheel rim provided with a complementary groove. The wheel rim of the '536 patent is designed with an annular groove and hump that accommodate the toe and groove respectively of the tire bead.

U.S. Pat. No. 4,015,652 discloses a radial tire where at least one bead portion is adhered to the rim at one of the seats with a cement having sufficient bonding strength to retain the bead portion on the rim during operation of the tire in the deflated condition.

Despite the variety of ingenious approaches to improving the interface between the bead and the rim to provide more robust runflat operation, none of the existing designs have provided an entirely satisfactory solution.

SUMMARY OF THE INVENTION

The present invention provides an improvement to the interface between the bead region of the tire and the wheel rim to maintain bead seating at very low inflation pressures and to resist the tendency the tire bead to rotate and roll off the bead seat of the tire rim when operated in an under-inflated or uninflated condition. A tire having a tread, a belt structure and a carcass structure comprising a pair of sidewalls, a pair of bead regions and one or more plies anchored in each bead region the tire is provided with a series or plurality of cavities in a surface of the bead regions that is in contact with a wheel rim during normal inflated operation.

In one embodiment the present invention the cavities are circular in their area of contact with the bead seat. The void spaces bounded by the cavities and the rim of the wheel are lenticular in shape having a partial spherical shape defined by the surface of the bead and having a cylindrical or conical shape defined by the bead seat. The cavities are arranged with uniform spacing around the circumference of the bead regions and are aligned in a circumferential pattern with a uniform minimum distance from the edges of the cavities to the axially inward edge of the bead toe.

During the process of installing the tire upon the wheel, the cavities are flattened against the bead seat and the air contained by void spaces defined by the bead cavities and the bead seat is substantially expelled from the void space. The cavities are surrounded by elastomeric material that provides an air-tight seal preventing air from leaking back into the void spaces defined by the cavities and the rim once the tire has been installed in the wheel. The cavities are held in a flattened condition against the bead seat by the bead core which generate compression on the rim when the tire is installed on a wheel rim and operated in a normally inflated condition on a vehicle.

Once the cavities have been flattened by installation or operation of the tire, the bead will resist separation from the wheel rim bead seat. Due to adherence force generated by the air vacuum, cavities in the vicinity of the bead toe, once flattened by installation or operation, will resist rotation of the bead region that would tend to lift or separate the bead toe from the rim bead seat.

In a second embodiment of the present invention, a pneumatic tire having a tread, a belt structure and a carcass structure comprising a pair of sidewalls, a pair of bead regions, one or more plies anchored in each bead region is provided with a torus cavity in a section of a surface of one or both bead regions that are in contact with a wheel rim during normal inflated operation. The torus cavity is aligned in a circumferential pattern with a uniform minimum distance from the edges of the torus cavity to the axially inward edge of the bead toe, having a minimum distance from the edges of the torus cavity to the axially inward edge of the bead toe.

The process of installing the tire upon the wheel causes the torus cavity to flatten against the bead seat and the air contained by void spaces defined by the torus cavity and the bead seat to be substantially expelled from the void space creating adherence force via vacuum. The surrounding elastomeric material of the torus cavity provides an air-tight seal preventing air from leaking back into the void spaces defined by the torus cavity and the rim once the tire has been installed in the wheel. The torus cavity may also be flattened or held in a flattened condition against the bead seat by the bead core when the tire is installed on a wheel rim and operated in a normally inflated condition on a vehicle. The torus cavity may also be flattened or held in a flattened condition against the wheel rim by the bead core when the tire is installed on a wheel rim and operated in an inflated or uninflated condition on a vehicle traveling in a straight line and at a constant speed.

Once the torus cavity has been flattened by installation or operation of the tire, the bead will resist separation from the wheel rim bead seat and resist rotation of the bead region that would tend to lift or separate the bead toe from the rim bead seat.

BRIEF DESCRIPTION OF THE DRAWINGS

Reference will be made in detail to preferred embodiments of the invention, examples of which are illustrated in the accompanying drawings. The drawings are intended to be illustrative, not limiting. Certain elements in selected ones of the drawings may be illustrated not-to-scale, for illustrative clarity.

Often, similar elements throughout the drawings may be referred to by similar references numerals. For example, the element 199 in a figure (or embodiment) may be similar in many respects to the element 299 in an other figure (or embodiment). Such a relationship, if any, between similar elements in different figures or embodiments will become apparent throughout the specification, including, if applicable, in the claims and abstract. In some cases, similar elements may be referred to with similar numbers in a single drawing. For example, a plurality of elements 199 may be referred to as 199a, 199b, 199c, etc.

The cross-sectional views presented herein may be in the form of "slices", or "near-sighted" cross-sectional views, omitting certain background lines which would otherwise be visible in a true cross-sectional view, for illustrative clarity.

Figure 1:
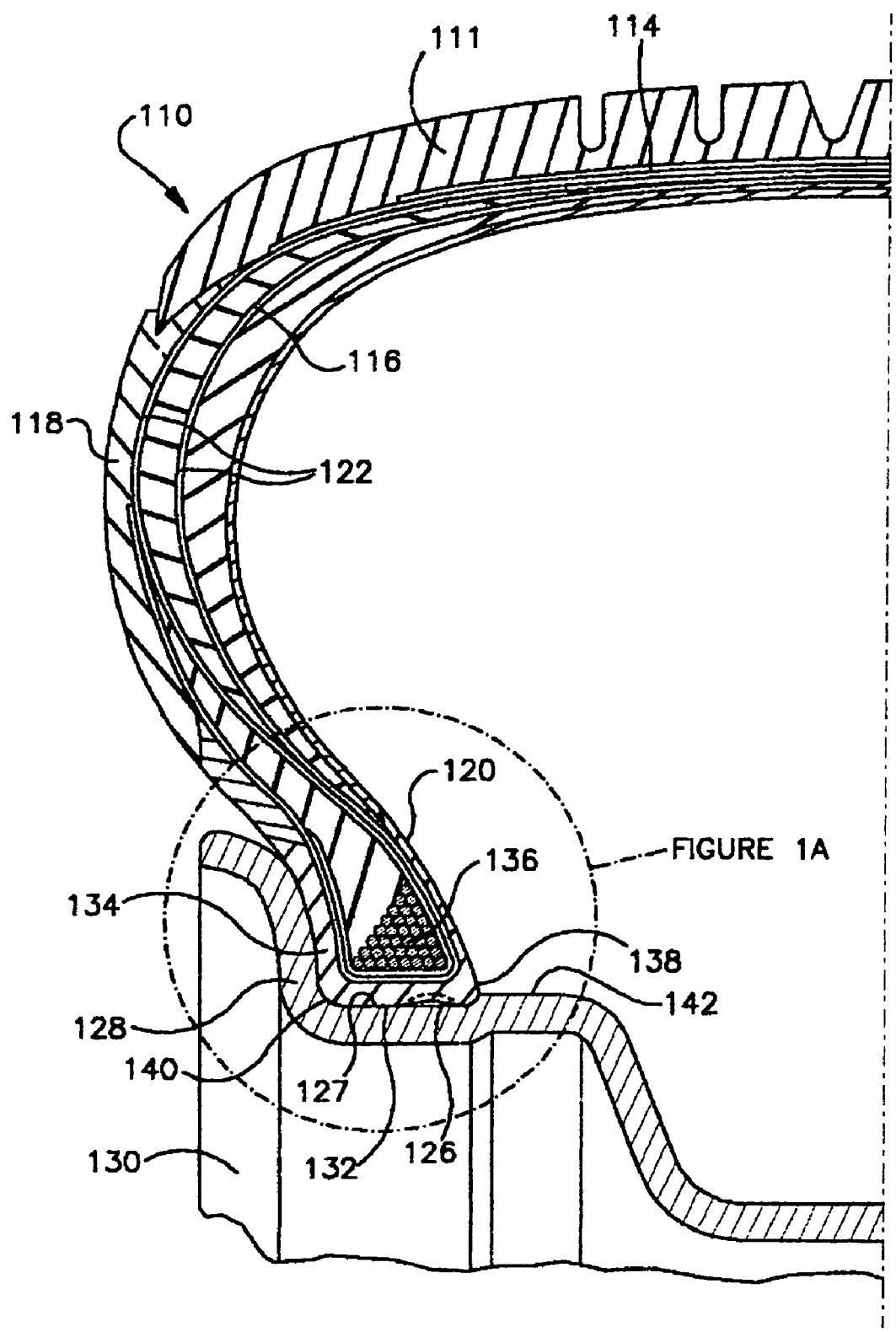
Figures 1A, 2A:
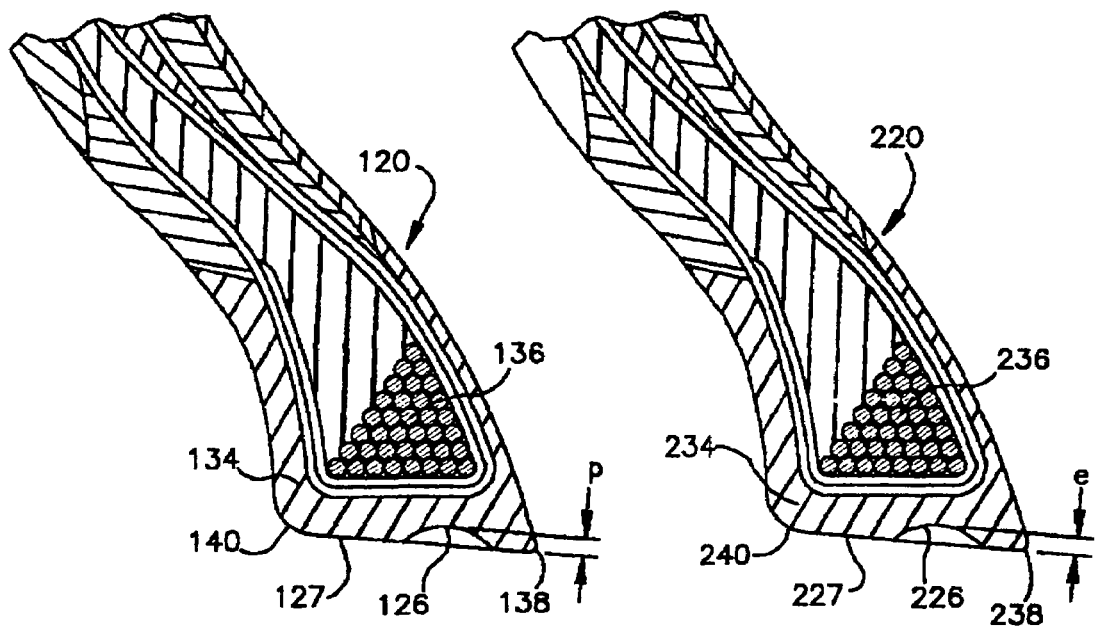
Figures 1B, 2B:
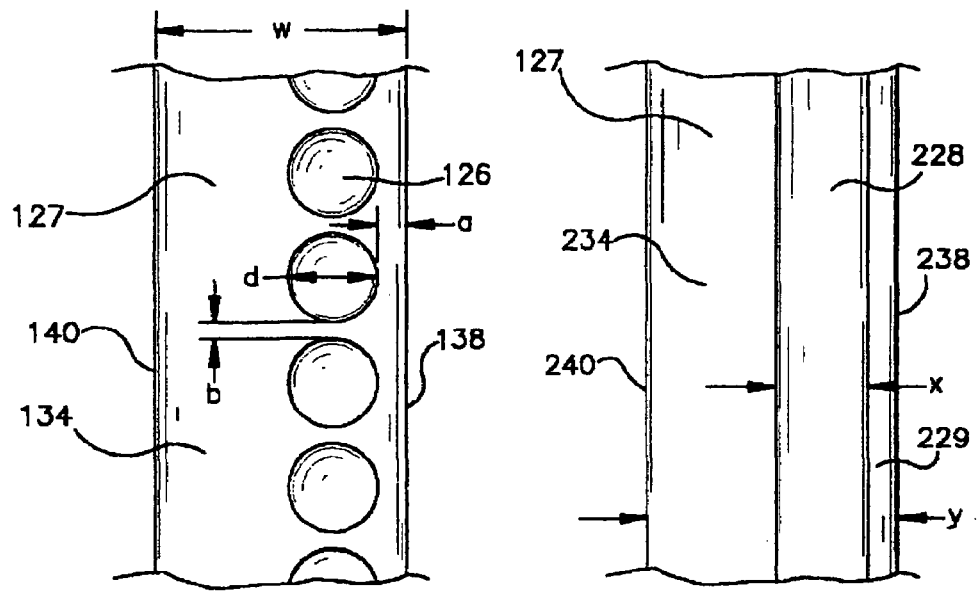
Figure 2:
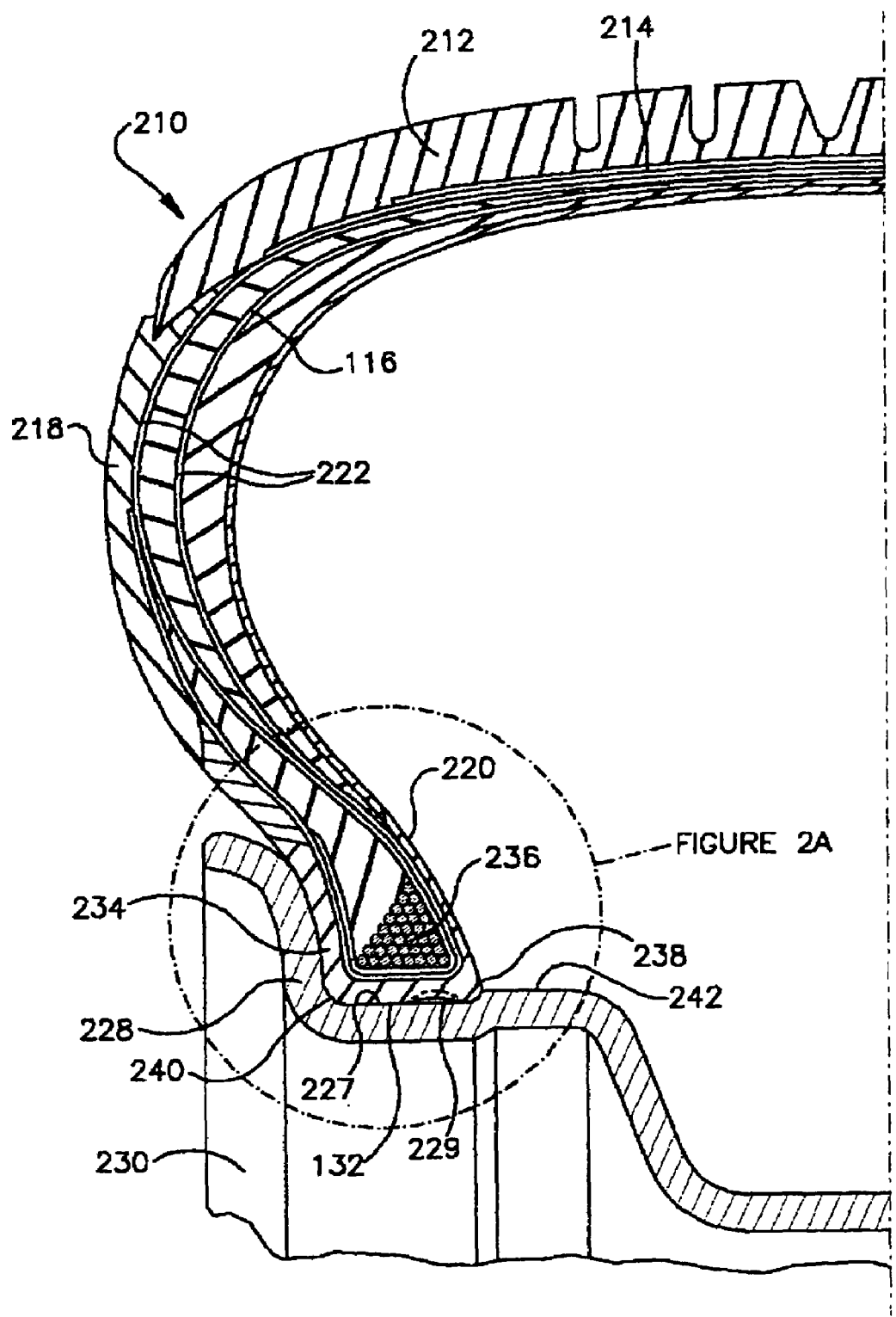

The structure, operation, and advantages of the present preferred embodiment of the invention will become further apparent upon consideration of the following description taken in conjunction with the accompanying drawings, wherein:

FIG. 1 is a cross-sectional view of a tire incorporating a first embodiment of the present invention;

FIG. 1a is a detailed cross-sectional view of the bead region of the tire of FIG. 1 showing a first embodiment of the present invention as a series of cavities in the seat of the bead;

FIG. 1b is a detailed view of the radially innermost surface of the bead region of FIG. 1a showing a series of cavities according to a first embodiment of the present invention;

FIG. 2 is a cross-sectional view of a tire incorporating a second embodiment of the present invention;

FIG. 2a is a detailed cross-sectional view of the second embodiment of the present invention wherein the bead region includes a circumferential, torus cavity; and FIG. 2b is a detailed view of the radially innermost surface of the bead region of FIG. 2a showing a circumferential torus cavity according to a second embodiment of the present invention.

DEFINITIONS

"Axial" and "Axially" means the lines or directions that are parallel to the axis of rotation of the tire.

"Axially Inward" means in an axial direction toward the equatorial plane.

"Axially Outward" means in an axial direction away from the equatorial plane.

"Bead" or "Bead Core" generally means that part of the tire comprising an annular tensile member of radially inner beads that are associated with holding the tire to the rim; the beads being wrapped by ply cords and shaped, with or without other reinforcement elements such as flippers, chippers, apexes or fillers, toe guards and chafers.

"Bead Seat" refers to the area of the wheel comprising a portion of the wheel rim and the flange that are normally in contact with the rim of the tire during normal inflated operation.

"Bead Toe" refers to a projection of the bead region radially and axially inward of the bead core.

"Bead Heel" refers to that portion of the bead that is axially outward and radially inward from the bead core.

"Belt Structure" or "Reinforcement Belts" or "Belt Package" means at least two annular layers or plies of parallel cords, woven or unwoven, underlying the tread, unanchored to the bead, and having both left and right cord angles in the range from 18 degrees to 30 degrees relative to the equatorial plane of the tire.

"Carcass" means the tire structure apart from the belt structure, tread, undertread over the plies, but including the beads.

"Circumferential" most often means circular lines or directions extending along the perimeter of the surface of the annular tread perpendicular to the axial direction; it can also refer to the direction of the sets of adjacent circular curves whose radii define the axial curvature of the tread, as viewed in cross section.

"Crown" or "Tire Crown" means the tread, tread shoulders and the immediately adjacent portions of the sidewalls.

"Equatorial Plane" means the plane perpendicular to the tire's axis of rotation and passing through the center of its tread; or the plane containing the circumferential centerline of the tread.

"Lateral" means a direction parallel to the axial direction.

"Ply" means a cord-reinforced layer of rubber coated radially deployed or otherwise parallel cords.

"Radial" and "radially" mean directions radially toward or away from the axis of rotation of the tire.

"Radial Ply Structure" means the one or more carcass plies or which at least one ply has reinforcing cords oriented at an angle of between 65 degrees and 90 degrees with respect to the equatorial plane of the tire.

"Radial Ply Tire" means a belted or circumferentially-restricted pneumatic tire in which at least one ply has cords which extend from bead to bead are laid at cord angles between 65 degrees and 90 degrees with respect to the equatorial plane of the tire.

"Rim-Bead Interface" refers to the area of contact between the rim of the wheel and the bead of the tire during normal inflated operation.

"Section Height" means the radial distance from the nominal rim diameter to the outer diameter of the tire at its equatorial plane.

"Section Width" means the maximum linear distance parallel to the axis of the tire and between the exterior of its sidewalls when and after it has been inflated at normal pressure for 24 hours, but unloaded, excluding elevations of the sidewalls due to labeling, decoration or protective bands.

"Shoulder" means the upper portion of sidewall just below the tread edge.

"Sidewall" means that portion of a tire between the tread and the bead.

"Tangential" and "Tangentially" refer to segments of circular curves that intersect at a point through which can be drawn a single line that is mutually tangential to both circular segments.

"Tread Cap" refers to the tread and the underlying material into which the tread pattern is molded.

"Tread width" means the arc length of the tread surface in the plane includes the axis of rotation of the tire.

"Wheel Flange" refers to a radially outward projection of the wheel rim at one or both of the axially outermost edges of the wheel.

DETAILED DESCRIPTION OF THE PREFERRED EMBODIMENT

Prior Art Embodiment

The present invention provides a general means to improve the interface between a tire bead and a wheel rim particularly for extended mobility technology (EMT) tires during under-inflated or uninflated operation. The tire bead of a conventional tire during normal inflated operation is held in place by tension in the bead core and pressure in the tire. However, in the design of EMT tires, conventional bead designs have been found inadequate to fully resist the forces on the bead region that occur when the tire is operated in an under-inflated or uninflated condition. A variety of designs have been developed that depend on modifications to the wheel rim and the tire bead to provide enhanced runflat capabilities. However, most of these designs are not compatible with either conventional tires or conventional rims and have not met with widespread acceptance. The present invention provides an improvement to the bead design that is compatible with conventional wheel rim designs.

The surfaces of conventional and EMT beads are normally smooth over the normal area of contact with the rim. U.S. Pat. No. 5,769,981 ('981) discloses a radial tire having bead regions with between two and ten circumferentially extending ribs projecting outward of the bead region outer surface to improve uniformity when mounted on a wheel rim. The present invention provides a series of cavities or circumferential indentation groove in the bead that would increase the adherence of the bead to the rim bead seat. Also by increasing the adherence of the bead to the rim in the vicinity of the bead toe the resistance of the bead region to bending forces can be increased.

Preferred Embodiment of the Present Invention

The present invention relates to improving the retention of the bead region of a tire on the bead seat of a conventional wheel rim and is particularly applicable to improving the runflat performance of EMT tires. One aspect of the present invention relates to providing a series of discrete cavities on the surface of the bead region of a tire. The invention anticipates many varieties of patterns, sizes and locations of the cavities on the surface of the bead region that would meet the essential objectives of the present invention with essentially equivalent means that fall within the scope of this invention.

Detailed Description of the First Embodiment

Referring to FIG. 1, there is illustrated a cross-sectional view of a runflat tire 110 incorporating a series of discrete cavities 126 on the surface of the bead region 120 of the tire in accordance with the first embodiment of the invention. The tire 110 has a tread 112, a belt structure 114, and a carcass structure 116, comprising a pair of sidewalls 118, a pair of bead regions 120, and one or more reinforcing carcass plies 122 anchored in each bead region 120. A series of cavities 126 are located in the surface 127 of the bead region 120 which contacts the wheel rim 128.

When the tire 110 is installed on a wheel 130, the cavities 126 are flattened against the rim bead seat 132 causing at least a 95 percent reduction in the volume of the cavities and causing the expulsion of about 90 percent of the air contained by the cavities. In addition, the initial size and shape of the cavities 126, the elasticity of the surrounding elastomeric material 134 in the bead region 120 and the nominal tension in the bead cores 136 may be designed to continue to flatten the cavities 126 in surface 127 against the bead seat 132. These design characteristics are selected so that the cavities 126 are maintained at a reduced volume which in turn causes any air or other gases to be substantially expelled from the cavities in the course of normal tire operation. Referring to FIG. 1, the volume of the cavity 126 prior to installation on the wheel 130, is indicated by a dashed line.

Furthermore, when the tire 110 of the present invention incorporates reinforced sidewalls 118 to provide extended runflat capability, the reinforced sidewall structure may be designed to flatten each of the cavities 126 against the bead seat 132 at least once during each rotation of the tire 110. This flattening assists in reducing the volume of the cavities 126 to substantially expel any gasses that may be contained by the cavities.

Referring to FIGS. 1A and 1B showing a detailed cross-section of the bead region 120 and a partial view of the radially innermost surface 127 of the bead region, respectively, the cavities 126 are evenly spaced about the radially innermost surface 127 of each bead region 120 in the proximity of the bead toe 138. In an exemplary tire, which is shown and described for illustration purposes only, the cavities 126, in their area of contact with the bead seat 132, have a diameter "d" of typically between 30% and 50% of the overall axial width "w" of the bead region 120. "w" measured from heel 140 to toe 138 is typically from 20 mm to 28 mm as measured in an axial direction. The axially located innermost point of the cavities 126 are located a distance "a" of typically between 1 mm to 4 mm from the radially innermost edge or toe 138 of the bead region 120. The minimum distance "b" between cavities 126 is close to the distance "a" value. The maximum initial depth "p" of the cavities 126, measured in a radial direction relative to the cylindrical plane of the nominal bead seat 132, is typically from 1 mm to 3 mm. In shape, the radially outermost surfaces of the cavities 126 conforms to a portion of a sphere. Thus formed with a radially outward spherical shape, the cavities 126 may be considered as having a lenticular shapes with one side having a spherical shape and the other side having a more or less cylindrical shape conforming to the shape of the rim bead seat 132. However, the cavities 126 of the present invention may have any shape providing that the quantity of air or other gasses contained by the cavity is substantially decreased by the installation or operation of the tire upon a wheel and that the surrounding elastomeric material 134 prevents air or other gasses from leaking back into the cavities 126.

Referring to FIG. 2, a second embodiment of the present invention is illustrated. The tire 210 has a tread 212, a belt structure 214, and a carcass structure 216, comprising a pair of sidewalls 218, a pair of bead regions 220, one or more reinforcing carcass plies 222 anchored in each bead region.

As shown by FIGS. 2A and 2B, which provide a detailed cross-section view of the bead region 220 and a partial view of the radially innermost surface 227 of the bead region 220, respectively, the radially innermost surface 227 of the bead region is provided with a circumferential torus cavity 226 located adjacent to bead toe 238. As shown in FIG. 2A the torus cavity 226 has a curved radially outermost surface that appears similar to that of the cavities 126 of first embodiment when seen in cross section. However, FIG. 2B, providing a plan view of the bead surface 227, shows that the torus cavity 226 is continuous in the second embodiment and extends circumferentially over the radially innermost surface of the bead region 220.

When the tire 210 is installed on a wheel 230, the torus cavity 226 is flattened against the rim bead seat 232 causing a substantial reduction in the volume of the torus cavity 226 and causing most of the air contained by the torus cavity 226 to be expelled. In addition, the initial size and shape of the torus cavity 226, the elasticity of the surrounding elastomeric material 234 and the nominal tension in the bead cores 236a, 236b may be designed to continue to flatten the torus 128 against the bead seat 232 causing the torus cavity 226 to be maintained at a reduced volume and causing any air or other gases to be substantially expelled from the cavities in the course of normal operation.

Referring to FIG. 2B, the torus cavity 226 provides a uniform cavity extending over the radially innermost surface of each bead region 220 in the proximity of the bead toe 238. In the exemplary tire 210, which is shown and described for illustration purposes only, the torus cavity 226 has a width "x" of typically between 30% and 50% of the overall axial width "y" of the bead region 220. The overall width "y" of the bead region 220, measured from heel 240 to toe 238 is from 2 mm to 28 mm as measured in an axial direction. Preferably, the axially innermost edges 226 of the torus cavity 226 is located from 1 to 6 mm from the radially innermost edge or toe 238 of the bead region 220. The maximum initial depth "e" of the torus cavity 226, measured in a radial direction relative to the cylindrical plane of the nominal bead seat 232, is typically from 1 mm to 3 mm. In shape, the radially outermost surfaces of the torus cavity 226 conforms to a portion of a torus having a radius typically from 6 mm to 12 mm in the axial direction and radius more or less equal to the radius of the bead in the radial direction. However, the torus cavity 226 may have any cross-sectional shape providing that the quantity of air or other gasses contained by the torus cavity 226 is substantially decreased by the installation or operation of the tire upon a wheel 230 and that the surrounding elastomeric material 234 prevents air or other gasses from leaking back into the torus cavity 226.

Dynamic Operation of the Inventive Concept

The dynamic operation of the inventive concept is described relative to the details of the first embodiment. However the basic principles of operation and the essential results are equivalent for the two embodiments described above as well as for a range of applications that could vary considerably in detail but not the spirit of the present invention. One skilled in the art will find no difficulty in applying the following discussion to both embodiments as well as to a variety of easily conceived alternatives.

Once the cavities 126 of the first embodiment have been flattened against the bead seat 132 reducing their volume and expelling a substantial portion of any gasses that may have been contained by the cavities, the surrounding elastomeric material 134 seals the edges of the cavities to the bead seat 132 preventing air or other gasses from leaking back into the cavities 126. Any attempt to separate a bead surface 127 provided with such cavities 126 will require an expansion in the volume of the cavities. However, since the quantity of the air or other gasses contained by the cavities 126 has been substantially reduced, small absolute increase in the volume of the cavities 126 will require a relatively large percentage increase in the volume of the cavities 126 with a large resulting decrease in the pressure of the air or other gasses contained within each the cavities 126. As a result, the pressure within the cavities 126 will be substantially reduced relative to the pressure of the air surrounding the bead region 126, and this net difference in pressure will resist the further separation of the bead region from the rim.

With the loss of air pressure, the sidewalls 118 bulge axially outward so that the compressive force is applied to the bead region 120 with an axially inward component. In addition, the bulging of the sidewalls 118 also introduces a bending stress which tends to rotate the bead regions 120 lifting the axially and radially innermost edge of the bead region, also known as the bead toe 138 from the bead seat 132. The rotation of the bead region 120 reduces the area of contact between the bead region 120 and the rim bead seat 132 of the wheel 130. The rotation also lifts the toe 138 of the bead from the rim bead seat 132 and facilitates the axially inward movement of tire 130 over any axially inward humps 142 in the rim.

The present invention provides a means to prevent the toe 138,238 from being separated from the rim bead seat 132. By placing a series of cavities 126 or a circumferential torus cavity 226 in the proximity of the toe 138,238 of a bead region 120,220, the separation of the toe 138,238 from the bead seat 132,232 is resisted by the net difference in pressure between the small volume of air and other gasses trapped in the cavities 138,238 and the surrounding air pressure. Preventing the toe 138,238 from being rotated out of position will cause the heel 140,240 of the bead region 120,220 to bear more firmly against the bead seat, increasing the frictional resistance of the bead to axial movement. In addition, if the wheel rim is provided with a hump 142 placed axially inward of the bead seat 132, the bead toe 138,238 will be held in position against the hump 142 where it can also provide resistance to axially inward movement. If the bead toe 138,238 were not held in position the bending moment transmitted to the bead region 120,220 could rotate the bead region and lift the bead toe 138,238 over the hump 142 in a process leading to the unseating of the bead region from the rim. However, while the use of a wheel 130, incorporating a hump 142 located axially inward of the bead seat 132 provides certain advantages, a hump 142 is not essential to the operation or benefits provided by the present invention.

What is claimed:

1. A pneumatic tire having a tread, a belt structure and a carcass structure comprising a pair of sidewalls, a pair of bead regions and one or more plies anchored in the bead regions, the tire being characterized by:
   a plurality of cavities extending along a radially innermost bead surface of each of the pair of bead regions in contact with a wheel rim during normal inflated operation; such that:
   the plurality of cavities are circumferentially spaced on the bead surface around the circumference of the bead regions;
   each one of the plurality of cavities is circular in its area of contact with a bead seat of the wheel rim; and
   each of the cavities is surrounded by elastomeric material that provides an air-tight seal to prevent air from leaking back into the void spaces defined by the cavities and the wheel rim once the tire has been mounted on the wheel.

2. The tire of claim 1 where the cavities form void spaces bounded by the bead region and the wheel rim that are lenticular in shape defined by the bead surface and the bead seat.

3. The tire of claim 1 where the cavities are evenly spaced circumferentially on the bead surface around the circumference of the bead regions.

4. The tire of claim 1 characterized in that the cavities are flattened against a bead seat of the wheel rim causing the air contained within void spaces defined by the cavities and the bead seat to be substantially expelled from the void spaces when the tire is mounted on the wheel.

5. The tire of claim 1 characterized in that the cavities are flattened against a bead seat of the wheel rim by bead cores within bead regions when the tire is mounted on a wheel rim and operated in a normally inflated condition.

6. The tire of claim 1 characterized in that the cavities are flattened against a bead seat of the wheel rim by bead cores within bead regions when the tire is mounted on a wheel rim and operated in an under inflated or uninflated condition.

* * * * *